(12) United States Patent
Sengupta et al.

(10) Patent No.: US 10,356,244 B1
(45) Date of Patent: Jul. 16, 2019

(54) AUTOMATED PREDICTIVE CALL ROUTING USING REINFORCEMENT LEARNING

(71) Applicant: FMR LLC, Boston, MA (US)

(72) Inventors: Shovon Sengupta, Bangalore (IN); Bibhash Chakrabarty, Bangalore (IN); Shishir Shekhar, Bangalore (IN); Alex Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/271,541

(22) Filed: Feb. 8, 2019

(51) Int. Cl.
*H04M 3/00* (2006.01)
*H04M 3/523* (2006.01)
*G06N 20/00* (2019.01)
*H04M 3/42* (2006.01)

(52) U.S. Cl.
CPC .......... *H04M 3/5232* (2013.01); *G06N 20/00* (2019.01); *H04M 3/42059* (2013.01); *H04M 2203/551* (2013.01)

(58) Field of Classification Search
CPC ............. H04M 3/5233; H04M 3/5232; H04M 3/5235; H04M 3/5175; H04M 3/5183; H04M 3/523; H04M 3/5158
USPC ............. 379/265.01–265.02, 265.11–265.14, 379/266.01–266.03, 266.08
See application file for complete search history.

(56) References Cited

U.S. PATENT DOCUMENTS

| | | | |
|---|---|---|---|
| 9,635,181 B1 | 4/2017 | McGann et al. | |
| 9,871,927 B2 | 1/2018 | Perez et al. | |
| 2015/0095271 A1 | 4/2015 | Ioannidis et al. | |
| 2017/0111509 A1 | 4/2017 | McGann et al. | |
| 2018/0082210 A1* | 3/2018 | McCord | G06N 7/005 |
| 2018/0082213 A1* | 3/2018 | McCord | G06N 20/00 |
| 2018/0121766 A1* | 5/2018 | McCord | G06K 9/6297 |

\* cited by examiner

*Primary Examiner* — Rasha S Al Aubaidi
(74) *Attorney, Agent, or Firm* — Proskauer Rose LLP

(57) ABSTRACT

Methods and apparatuses are described for automated predictive call routing using reinforcement learning. A server captures a bitstream of an incoming call from a first client device, the bitstream including metadata comprising attributes of the incoming call and attributes of a user of the device. The server determines an identity of the user based upon the metadata. The server generates a first context vector comprising a multidimensional array corresponding to the metadata. The server inserts the first vector into a high-dimensional vector space comprising historical context vectors, each historical vector (i) corresponding to metadata associated with a historical call and (ii) associated with an income value and a routing decision. The server determines historical vectors in proximity to the first vector. The server identifies one of the determined historical vectors with an optimal income value and routes the bitstream to a second device using the routing decision.

18 Claims, 4 Drawing Sheets

| Call ID 402 | Call Timestamp 404 | Context Vector 406 | Routing Decision 408 | 90 day OI 410 |
|---|---|---|---|---|
| 1 | 03/15/2017 | [0.38, 0.24, .......] | Sales | $ 100 |
| 2 | 03/13/2017 | [0.18, 0.22, .......] | Service | $ 60 |
| 3 | 03/10/2017 | [0.38, 0.14, .......] | Sales | $ 120 |
| 4 | 03/05/2017 | [0.32, 0.33, .......] | Service | $ 60 |
| 5 | 03/04/2017 | [0.38, 0.26, .......] | Sales | $ 200 |

FIG. 4

AUTOMATED PREDICTIVE CALL ROUTING USING REINFORCEMENT LEARNING

TECHNICAL FIELD

This application relates generally to methods and apparatuses, including computer program products, for automated predictive call routing using reinforcement learning.

BACKGROUND

In a typical call center environment, routing of inbound calls is conducted with no or minimal advance knowledge of the caller's intent or reason behind the call. For example, some call centers simply route calls in a first-in-first-out (FIFO) manner to available customer service representatives (CSRs) without regard to the reason for the call or the skillset of the individual CSRs—as some CSRs may be better equipped or experienced to handle specific types of calls. In this scenario, it is not uncommon for a single call to be manually rerouted to multiple different CSRs before reaching an appropriate representative. As a result, the average time for calls on hold and for support resolution increases, adversely affecting the customer experience. In another scenario, call centers are configured to obtain just-in-time information about the caller and/or call, usually by leveraging automated systems such as interactive voice response (IVR) technology or automated attendants, and then route the call to a CSR based upon this information. In these examples, the IVR prompts are typically limited to predefined, broad options and generally do not accurately reflect the specific intent behind a customer's call. As a result, it may take several minutes for a customer to navigate an IVR menu in order to reach a CSR, and yet the CSR may still have to request or verify such information from a caller before the CSR can fully understand why the customer is calling and formulate an appropriate response.

Existing computing systems that analyze customer calls for routing to customer service agents or systems typically rely on manual input provided by the caller at the time the call is made (e.g., customer identifier, reason for call, etc.) to determine which CSR or automated computing system should receive the call. The danger is that the routing decisions made on the basis of customer-provided input may route the call to the incorrect destination (e.g., to a CSR or backend system that is not capable of resolving the issue, or to a CSR that is costlier from a resource perspective when the call is unlikely to result in addition income for the organization). In addition, these systems fail to account for prior operating income (OI) that resulted from a specific caller's previous interactions with the organization. For example, a caller with a certain user profile (e.g., asset value, account balance, demographics, etc.) may have previously called a customer service center for resolution of a problem with his or her account, but ended up adding premium services or making an additional purchase/investment stemming from the call because the call was routed to a sales-oriented CSR. As a result, it can be desirable to route that caller in the future (and other similar callers) to CSRs that can leverage income generation skills to realize additional value from the customer interaction. Existing call routing systems do not account for such income generation in making future call routing decisions, and thus these systems typically make routing decisions that may not provide an increased opportunity for additional income generation. In addition, these types of call routing systems may not be able to leverage a large corpus of historical voice call data using advanced machine learning techniques like reinforcement learning to make more accurate predictions about how to optimally route specific calls originating from specific callers. Generally, currently-available static routing systems do not take into account changing customer needs over a period of time. The needs of customers change based on a multitude of factors (e.g., life stage, financial health, etc.). A static routing system is therefore not able to optimally make call routing decisions as the underlying customer characteristics change.

SUMMARY

Therefore, what is needed are methods and systems that can leverage a large corpus of historical voice call routing and income data in a reinforcement learning artificial intelligence framework to generate call routing decision logic for newly-received voice calls. The techniques described herein provide the technical advantage of generating highly-dimensionalized context vectors for each voice call based upon specific attributes of the call, and then identifying historical calls that have similar context vectors in order to predict an optimal routing decision and income value for the incoming call. The present methods and systems adapt to changing customer characteristics (shown through attributes such as asset value, types of accounts, and the like). As explained above, preferred or optimal call routing for a customer call is not static over time. It varies based on changes that happen to the underlying customer attributes. In addition, the methods and systems do not require manual re-training of the underlying machine learning model that generates a call routing decision. Learning happens continuously by way of the reinforcement learning approach, resulting in a more efficient and robust machine learning model and better call routing decisions.

The invention, in one aspect, features a computerized method of automated predictive call routing using reinforcement learning. A server computing device captures a bitstream corresponding to an incoming voice call originating from a first client computing device. The bitstream includes metadata comprising one or more attributes of the incoming voice call and one or more attributes of a user of the first client computing device. The server computing device determines an identity of the user of the first client computing device based upon the bitstream metadata. The server computing device generates a first context vector for the incoming voice call, the first context vector comprising a multi-dimensional array corresponding to at least a portion of the bitstream metadata. The server computing device inserts the first context vector into a high-dimensional vector space comprising a plurality of historical context vectors, each historical context vector (i) corresponding to at least a portion of metadata associated with a historical voice call and (ii) associated with an income value and a routing decision. The server computing device determines one or more historical context vectors in the high-dimensional vector space that are in proximity to the first context vector, based upon a distance measure between the first context vector and the one or more historical context vectors. The server computing device identifies one of the determined historical context vectors that has an optimal income value. The server computing device routes the bitstream of the incoming voice call to a second client computing device to establish a communication session between the first client computing device and the second client computing device, using the routing decision associated with the identified historical context vector that has an optimal income value.

The invention, in another aspect, features a system for automated predictive call routing using reinforcement learning. The system comprises a first client computing device, a second client computing device, and a server computing device coupled to the first client computing device and the second client computing device. The server computing device comprises a memory for storing computer-executable instructions and a processor that executes the computer-executable instructions to capture a bitstream corresponding to an incoming voice call originating from the first client computing device, the bitstream including metadata comprising one or more attributes of the incoming voice call and one or more attributes of a user of the first client computing device. The server computing device determines an identity of the user of the first client computing device based upon the bitstream metadata. The server computing device generates a first context vector for the incoming voice call, the first context vector comprising a multidimensional array corresponding to at least a portion of the bitstream metadata. The server computing device inserts the first context vector into a high-dimensional vector space comprising a plurality of historical context vectors, each historical context vector (i) corresponding to at least a portion of metadata associated with a historical voice call and (ii) associated with an income value and a routing decision. The server computing device determines one or more historical context vectors in the high-dimensional vector space that are in proximity to the first context vector, based upon a distance measure between the first context vector and the one or more historical context vectors. The server computing device identifies one of the determined historical context vectors that has an optimal income value. The server computing device routes the bitstream of the incoming voice call to the second client computing device to establish a communication session between the first client computing device and the second client computing device, using the routing decision associated with the identified historical context vector that has an optimal income value.

Any of the above aspects can include one or more of the following features. In some embodiments, the server computing device captures an income value associated with the incoming voice call after routing the bitstream of the incoming voice call to the second client computing device, and updates the first context vector in the high-dimensional space to be associated with (i) the income value associated with the incoming voice call and (ii) the routing decision used to route the bitstream of the incoming voice call. In some embodiments, the routing decision comprises an identification of one or more client computing devices that can receive the incoming voice call.

In some embodiments, generating a first context vector for the incoming voice call comprises identifying a plurality of features of the incoming voice call to be represented in the first context vector, clustering the plurality of identified features of the incoming voice call into a subset of identified features, and converting each identified feature in the subset of identified features into a numeric value based upon the bitstream metadata and aggregating the numeric values into a multidimensional array. In some embodiments, the distance measure between the first context vector and the one or more historical context vectors comprises one or more of: a Cosine distance measure or a Euclidian distance measure. In some embodiments, the one or more historical context vectors in the high-dimensional vector space that are in proximity to the first context vector are nearest neighbors to the first context vector.

In some embodiments, identifying one of the determined historical context vectors that has an optimal income value comprises predicting, by the server computing device, a confidence value for each of the determined historical context vectors, based upon (i) the distance measure between the first context vector and the determined historical context vector and (ii) the income value associated with the determined historical context vector, and selecting one of the determined historical context vectors that has a highest predicted confidence value. In some embodiments, identifying one of the determined historical context vectors that has an optimal income value comprises selecting a first set of the determined historical context vectors that are associated with a first routing decision and are associated with different income values, selecting a second set of the determined historical context vectors that are associated with a second routing decision and are associated with different income values, sampling one of the determined historical context vectors from each of the first set of determined historical context vectors and the second set of determined historical context vectors, and identifying the sampled historical context vector that has a highest income value.

In some embodiments, routing the bitstream of the incoming voice call to a second client computing device comprises identifying a network address of the second client computing device based upon the routing decision, and redirecting communications from the first client computing device to the second client computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is an exemplary database table depicting the historical context vectors as stored in a database.

DETAILED DESCRIPTION

Figure 1:
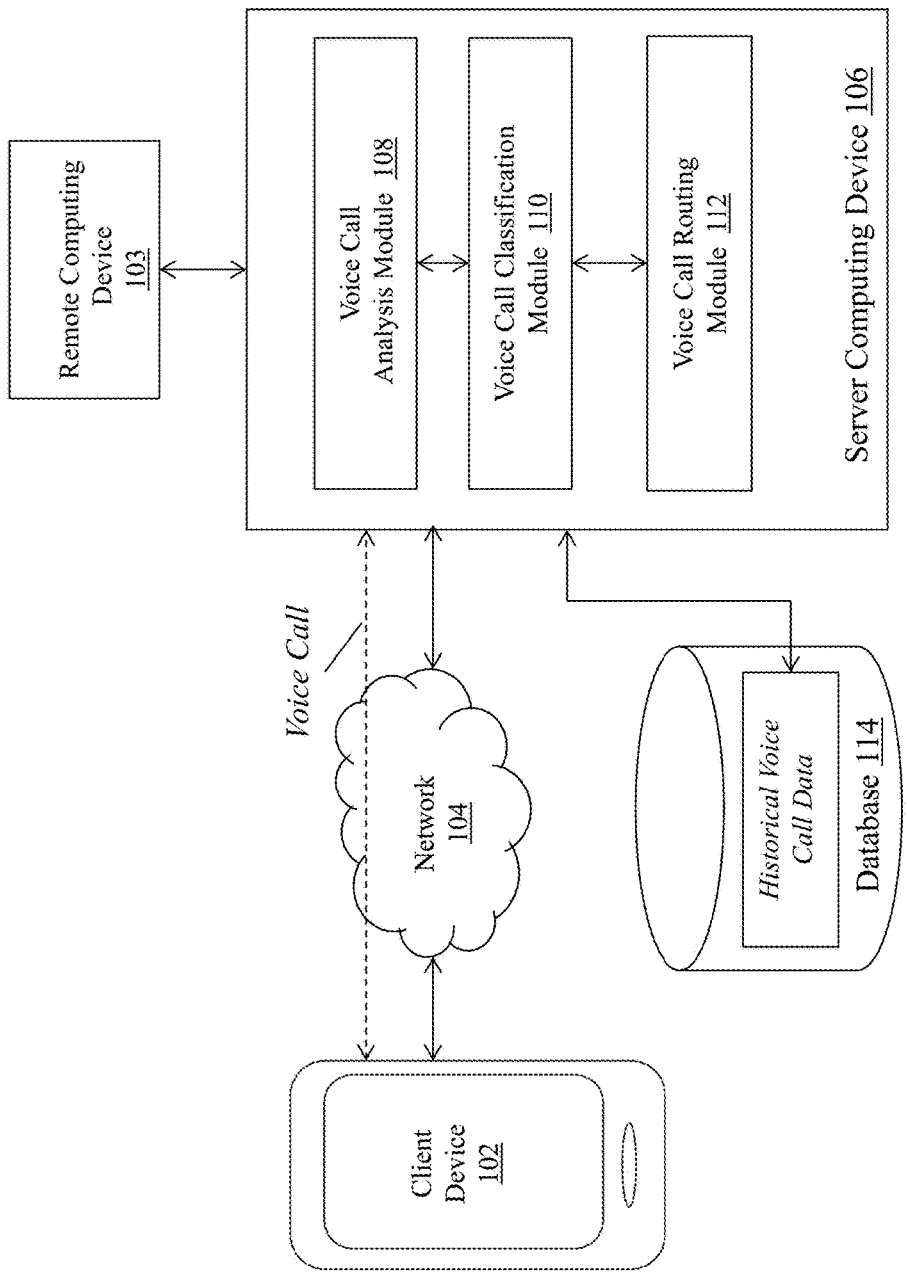
FIG. 1 is a block diagram of a system for automated predictive call routing using reinforcement learning.

FIG. 1 is a block diagram of a system 100 for automated predictive call routing using reinforcement learning. The system 100 includes a client computing device 102, a client computing device 103, a communications network 104, a server computing device 106 that includes a voice call analysis module 108, a voice call classification module 110, and a voice call routing module 112, and a database 114 that includes historical voice call data.

The client device 102 connects to the communications network 104 in order to communicate with the server computing device 106 to provide input and receive output relating to the process of automated predictive call routing using reinforcement learning as described herein. Exemplary client devices 102 include but are not limited to computing devices such as smartphones, tablets, smart watches, IP telephony devices, and internet appliances, or other devices (e.g., analog telephones) capable of initiating a voice call either via packet-based network or circuit-switched network. It should be appreciated that other types of devices that are capable of connecting to the components of the system 100 can be used without departing from the scope of invention. Although FIG. 1 depicts a single client device 102, it should be appreciated that the system 100 can include any number of client devices.

The remote device 103 is a computing device coupled to the server computing device 106 and used to receive voice calls that originate from the client device 102. In one example, the remote device 103 is a workstation (e.g., desktop computer, telephony device) of a customer service agent in a call center that enables the agent to receive voice calls, access information and perform actions using software on the remote device 103 to provide responses and/or solutions to messages submitted by the client device 102. The remote device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. In some embodiments, the remote device 103 is a telephony device that is coupled to a computing device, where the telephony device receives a voice call that originated at the client device 102 and is routed through the server computing device 106 as described herein. As can be appreciated, other types of remote devices 103 that can establish a voice communication session with the server computing device 106 and/or the client device 102 are within the scope of invention. In some embodiments, the remote device 103 is connected directly to the server computing device 106 (e.g., via local cable) and in some embodiments, the remote device 103 is connected to the server computing device 106 via the communications network 104 and/or one or more local networks.

The communications network 104 enables the client device 102 to communicate with the server computing device 106 and the remote device 103. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 a device including specialized hardware and/or software modules that execute on a processor and interact with memory modules of the server computing device 106, to receive data from other components of the system 100, transmit data to other components of the system 100, and perform functions for automated predictive call routing using reinforcement learning as described herein. The server computing device 106 includes several computing modules 108, 110, 112 that execute on the processor of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

The database 114 is a computing device (or in some embodiments, a set of computing devices) coupled to the server computing device 106 and is configured to receive, generate, and store specific segments of data relating to the process of automated predictive call routing using reinforcement learning as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 114 is MySQL™ available from Oracle Corp. of Redwood City, Calif.

The database 114 includes historical voice call data which, in some embodiments, is a dedicated section of the database 114 that contains specialized data used by the other components of the system 110 to perform the automated predictive call routing using reinforcement learning as described herein. Further detail on the structure and function of the historical voice call data is provided below.

Figure 2:
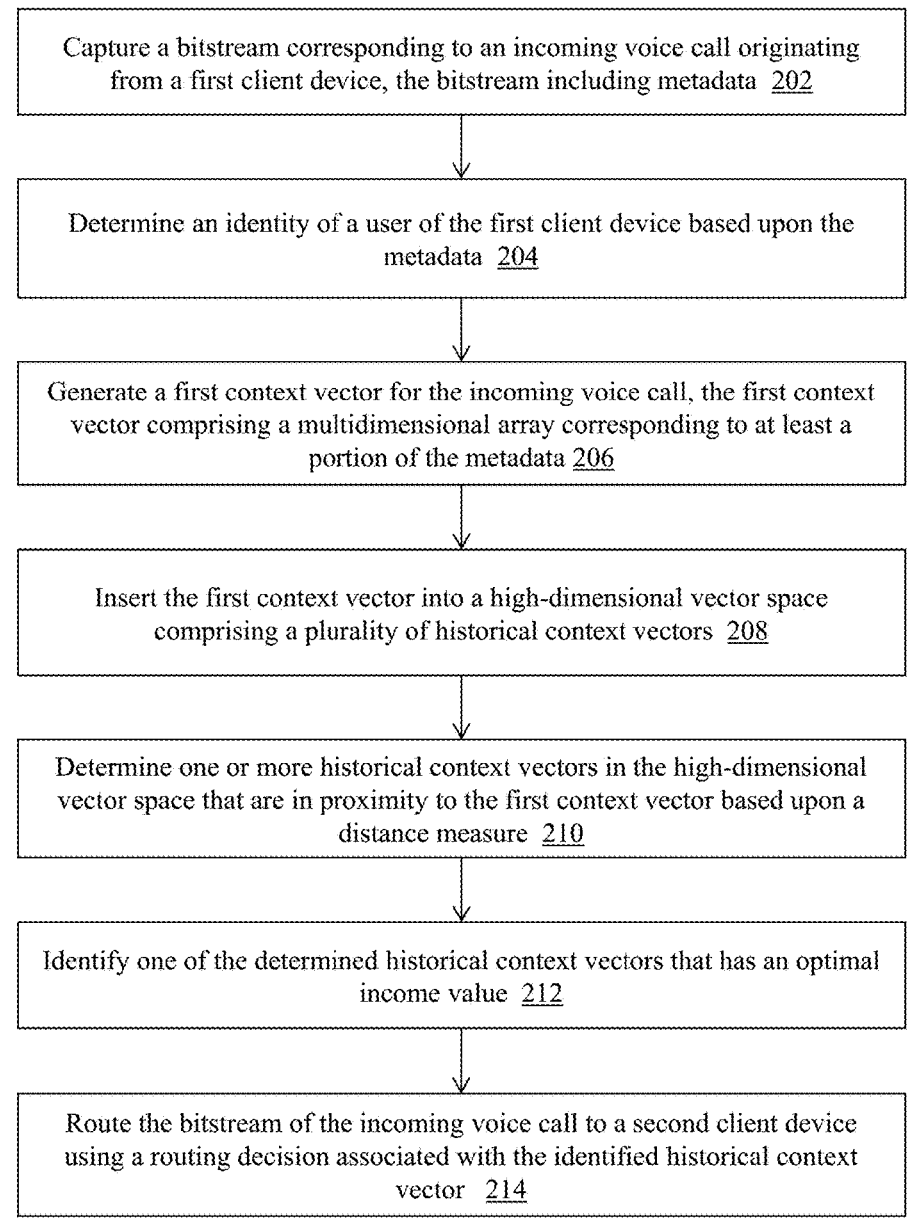
FIG. 2 is a flow diagram of a method for automated predictive call routing using reinforcement learning.

FIG. 2 is a flow diagram of a method 200 for automated predictive call routing using reinforcement learning using the system 100 of FIG. 1. A user at client device 102 initiates a voice call to a customer service center, and the voice call traverses the communications network 104 before the call reaches the server computing device 106 at the customer service center and a communication session between the client device 102 and the server computing device 106 is established. As part of the communication session establishment, the client device 102 transmits a bitstream comprising digitized audio (i.e., of the user's speech) as well as metadata that contains information relating to technical and non-technical attributes of the voice call, such as origination address, destination address, time and date, network routing attributes, service provider attributes, data compression (e.g., codec), device identifier(s), user identifier(s), and so forth. In some embodiments, the metadata further includes information collected from the user and/or the client device 102 regarding the reason or intent for the call. For example, a user may dial a specific phone number (or access a specific link in an app) that indicates a possible reason for the user's call (e.g., calling a sales number vs. a service number). In another example, the voice call may connect to an interactive voice response (IVR) system prior to reaching the server computing device 106, and the IVR system can ask the user for information about the call (and/or provide prompts to the user to discover a possible reason for the user's call). The system can incorporate this information into the metadata for the voice call, to be received by the voice call analysis module 108 of server computing device 106. When the voice call analysis module 108 receives the voice call from the communications network 104, the module 108 captures (202) a bitstream corresponding to the incoming voice call, including the digitized audio and the metadata comprising one or more attributes of the incoming voice call and one or more attributes of a user of the client device 102, as explained above.

The voice call analysis module 108 determines (204) an identity of the user of the client device 102 based upon the bitstream metadata. For example, the metadata can include a user identifier (e.g., user ID, account number, phone number) provided by the user at client device 102 or otherwise captured locally by client device 102, and incorporated into the voice call metadata when the call is originated. In another example, the client device 102 can interact with an IVR system (noted above) that requests identifying information from the user of client device 102 when the voice call connects. The voice call analysis module 108 can retrieve information about the identity of the user (such as a user profile) from, e.g., database 114 based upon the user-specific metadata that is included as part of the voice call. In some embodiments, the module 108 can further retrieve the user's call history-including prior voice call metadata and information about operating income derived from the user's prior voice calls-when determining the user's identity.

Upon establishing a communication session with the client device 102, receiving the digitized audio bitstream and call metadata, and identifying the user of client device 102, the voice call analysis module 108 transmits the call metadata to the voice call classification module 110, which generates (206) a first context vector for the incoming voice call. The first context vector comprises a multidimensional array that corresponds to at least a portion of the bitstream metadata. Generally, each value in the context vector relates to one feature associated with the voice call and/or the user that originated the voice call. Below is a portion of an exemplary context vector generated by the voice call classification module 110 based upon an incoming voice call:

[1.23, 0.22, 0.11, 0.75, 0.03, 1.09, . . . , 0.66]

As shown above, the context vector represents a plurality of call-related and user-related attributes in a numeric array. In one embodiment, the context vector consists of 63 customer data attributes. These are attributes derived from a user profile, including elements relating to demographic, transactional and interaction history of customers. Below are some examples of what might constitute the attributes that make up a context vector:

Age of customer
Value of Total Assets with Fidelity
Assets held in brokerage account
Frequency of trades
Days since last interaction
Days since last guidance session Each of these attributes can be on a different scale (e.g., age will typically be 0-100 while total assets may have a much wider spread). The system can use a technique called standardization to bring each of these attributes to the same scale (an example of which is described at https://en.wikipedia.org/wiki/Feature_scaling#Standardization).

In the same way, the system 100 also generates a context vector for a plurality of historical voice calls that are stored in database 114, where the historical voice calls are further associated with a routing decision (e.g., to which remote device 103 and/or CSR was the historical voice call routed?) and an income value (e.g., how much OI was generated as a result of the voice call routing decision?). The system 100 can generate the context vectors for the historical voice calls as a batch process, and store the generated context vectors in database 114 for use in classifying subsequent incoming voice calls in real-time, as described herein.

Figure 3:
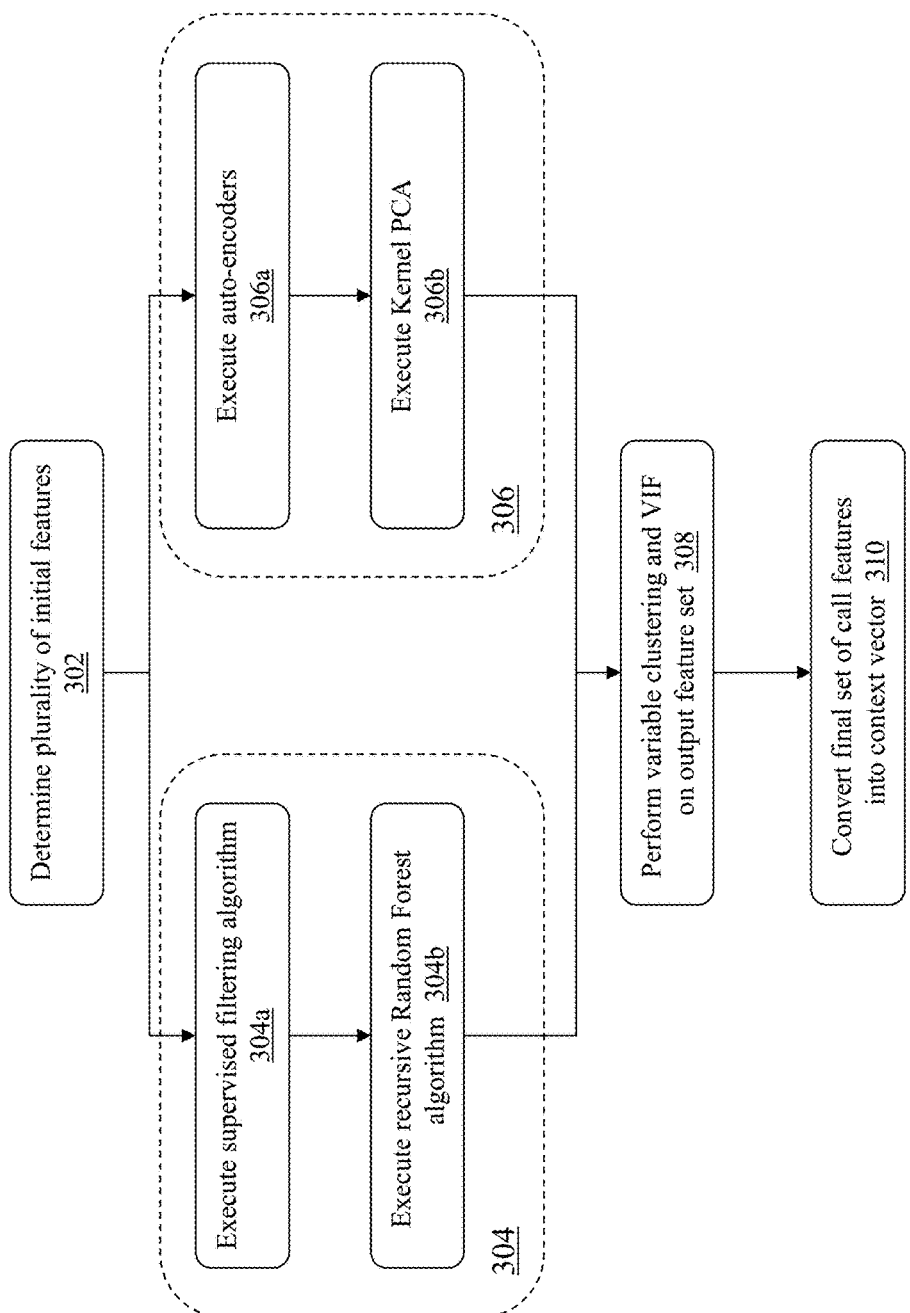
FIG. 3 is a data pre-processing and augmentation workflow executed by the voice call classification module.

In some embodiments, in order to generate the context vector for the incoming voice call and the historical voice calls, the voice call classification module 110 employs the data pre-processing and augmentation workflow of FIG. 3. The module 110 determines (302) a plurality of initial features to include in the context vector, based in part upon analysis of certain user attributes. For example, the module 110 can determine certain features that are derived from a user's transactional history (e.g., net flows, days since last withdrawal/deposit), the user's profile history (e.g., type of account(s) asset value) and so forth. The module 110 can capture the underlying data associated with each of the plurality of initial features for generation of the context vector.

The module 110 then performs a series of supervised feature selection machine learning algorithms (collectively, 304) and a series of unsupervised feature selection machine learning algorithms (collectively, 306) to adapt the larger set of initial call features into a smaller set of final call features that are then vectorized into the context vector for the voice call. As shown in FIG. 3, the module 110 executes (304*a*) a supervised filter algorithm (e.g., Linear Discriminant Analysis (LDA), Ridge regression, LASSO) on the set of initial features to train a model that finds one or more combinations of features-typically, a subset of features-which correlate to optimal or preferable income values. Then, the module 110 executes (304*b*) a recursive Random Forest algorithm on the combination of features identified from the supervised filter algorithm to train a model that further identifies one or more combinations of features that correlate to specific income values.

At the same time, the module 110 executes (306*a*) a non-sequential auto-encoder artificial neural network on the plurality of initial features to reduce the dimensionality of the initial feature set. In some embodiments, different layers (dense) and other hyper-parameters like encoding and decoding dimensions are chosen. The module 110 finds preferred layer values using grid search and at the final stage, the optimality was found based on a similarity index between encoded and decoded features. Then, the module 110 executes (306*b*) a Kernel Principal Component Analysis (PCA) algorithm on the reduced feature set from the auto-encoder to further reduce the dimensionality of the feature space.

Once the voice call classification module 110 has executed the supervised feature selection algorithms 304 and the unsupervised feature selection algorithms 306 on the set of initial call features, the module 110 performs (308) a variable clustering technique and variance inflation factor (VIF) on the output feature set to remove multi-collinearity. Then, the module 110 converts (310) the final set of call features into the context vector (e.g., as mentioned above, 63 generic customer attributes can be selected as the final context vector).

Turning back to FIG. 2, the voice call classification module 110 inserts (208) the context vector for the incoming voice call into a high-dimensional vector space comprising a plurality of the historical call context vectors. As described above, each of the historical call context vectors corresponds to at least a portion of the metadata associated with a historical voice call (e.g., initiated by the same user and/or initiated by other users) and each of the historical context vectors is associated with an income value and a routing decision. FIG. 4 is an exemplary database table depicting the historical context vectors as stored in database 114. As shown in FIG. 4, each row of the table relates to an historical voice call and includes data such as a call identifier 402, a call timestamp 404, a context vector 406 for the call, a routing decision 408 (i.e., how the historical voice call was routed by the system), and a 90-day OI value 410 (i.e., how much OI was realized from the call/user in the 90 days after the call was processed). The voice call classification module 110 retrieves the historical context vectors from database 114 and generates the high-dimensional vector space using the historical context vectors, so that each historical context vector is placed in proximity to other similar context vectors (e.g., by determining a distance measure between each context vector based upon the similarity of features—where context vectors with smaller distance measures are closer to each other).

The voice call classification module 110 inserts the context vector for the incoming voice call into the high-dimensional vector space by determining a distance measure between the incoming call context vector and each of the historical context vectors in the space. In one embodiment, the module 110 uses a Euclidian distance measure, as shown in the following exemplary equation where each of the features in the incoming call context vector (q1, q2, . . . qn) is compared to the corresponding features in the historical call context vector (p1, p2, . . . pn):

$$d(q,p) = \sqrt{(q_1-p_1)^2 + (q_2-p_2)^2 + \ldots + (q_n-p_n)^2}$$

In another embodiment, the module 110 uses a Cosine distance measure, as shown in the following exemplary equation, where the incoming call context vector (a) is compared to the historical call context vector (b):

$$\cos\theta = \frac{\vec{a} \cdot \vec{b}}{\|\vec{a}\|\|\vec{b}\|}$$

The voice call classification module 110 determines (210) one or more historical context vectors in the high-dimensional vector space that are in proximity to the first context vector based upon at least one of the distance measures described above. These historical context vectors can be thought of as the 'neighbors' or 'neighborhood' for the incoming call context vector in the high-dimensional space—the distance measure acts as a cutoff to define which neighboring historical call context vectors are similar enough to the incoming call context vector to be useful for determining a routing decision for the incoming voice call. In some embodiments, to decide the optimal distance cutoff, the module 110 can apply a minimum neighborhood approach, where the module 110 chooses a distance cutoff at which at least 90% of incoming voice calls have at least one neighboring historical call context vector. It should be appreciated that other distance cutoffs can be employed within the scope of invention.

Once the voice call classification module 110 has determined the nearest neighboring historical call context vectors as described above, the module 110 identifies (212) one of the nearest neighbor historical call context vectors that has an optimal income value (and thus should inform the routing decision for the incoming voice call). The module 110 can use a number of different self-learning multi-arm bandit (MAB) techniques to identify the historical call context vector with an optimal income value, including Upper Confidence Bounds-1 (UCB1) algorithms and Thompson Sampling (TS) algorithms as described below. It should be appreciated that the voice call classification module 110 can utilize other types of algorithms to determine an optimal income value or routing decision within the scope of invention.

For the UCB algorithm, the module 110 can compute the UCB for each arm of the MAB as follows:

$$UCB = \bar{x}_j + \alpha\sqrt{2\log t / n_j}$$

where $\bar{x}_j$ is the empirical mean income value in the chosen neighborhood of historical call vectors;
t is the number of plays so far;
$n_j$ is the number of times action j has been played; and
$\alpha$ is a balancing factor between exploration and exploitation.

After computing the UCB for each arm, the module 110 plays the arm with the higher UCB. Generally, the UCB1 algorithm makes a routing decision based upon the following two factors: 1) What is the average reward (i.e., operating income) seen in the past from similar customer calls (based on neighborhood)?; 2) How certain is the UCB1 about its estimates? For example, if the UCB1 has tried an action less often, the estimated reward is less accurate or, in other words, the confidence interval of the action is larger. The confidence interval gets smaller as more information is learned (i.e., the action is tried more often). So instead of trying the action with highest average reward, the UCB1 tries the action with the highest upper bound on its confidence interval. As a result, UCB1 helps randomize the choices and decide the optimal rate for exploration and exploitation.

For the TS algorithm, the concept is to randomly pick an action (i.e., a particular call routing decision) according to its probability of being optimal. The probability is calculated on the fly for each call based on similar calls (e.g., in the neighborhood) in the past for which the module 110 has seen the reward (i.e., operating income). The TS algorithm ensures that actions with larger expected rewards tend to be exploited, while the randomness in choice of action ensures that the algorithm continues to explore.

Thompson Sampling uses a Bayesian approach of finding posterior outcomes based on prior information. As applied in the voice call classification module 110, rewards for each arm of the TS algorithm are binarized, and the optimal routing decision is chosen given the historical voice call context information. An exemplary TS algorithm as executed by the voice call classification module 110 is shown below:

Hyper-Parameters:
  1) Distance Measures: a.) Euclidean; b.) Cosine
  2) Radius Grid for neighborhood selection: [0.5,1,2,3,4,5]
Algorithm:
Probability of an Arm being pulled matches the Bayesian Estimate that the Arm is the Optimal Arm

```
1: S_i = 0, F_i = 0.
2: for t = 1, 2, . . ., do
3:     For each arm i = 1, . . .,N, generate θ_i(t) from the beta
distribution with parameters (S_i + 1, F_i + 1).
4:     Play arm i(t) := arg max θ_i(t) and observe reward r̃.
5:     Perform a Bernoulli trial with success probability r̃ and
observe output r.
6:     if r = 1, then S_i = S_i + 1, else F_i = F_i + 1.
7: end for
```

Upon generating the incoming call context vector, the voice call classification module 110 performs the following algorithmic steps:

Step 1: For each incoming call—
sales_s=salesf=service_s=service_f=0 (global counters)
For each call in the neighborhood:
If (routing_decision==sales & OI>=$25) then sales_s=sales_s+1
Elself (routing==sales & OI<$25) then sales_f=sales_f+1
Elself (routing==service & OI<=$0) then service_s=service_s+1
Elself (routing==service & OI>$0) then service_f=service_f+1
return beta(sales_a, sales_b), beta(service_a, service_b)
Step 2: sample one value from each of the two beta distributions obtained in Step 1;
Step 3: route the incoming voice call to the arm that has the higher value.

Therefore, based upon the above MAB algorithmic approaches, the voice call classification module 110 identifies one of the historical call context vectors that is a neighbor of the incoming call context vector in the high-dimensional space and that has an optimal income value. The module 110 can then determine the routing decision associated with the identified historical call context vector (e.g., a particular CSR and/or backend computing system), and then instruct the voice call routing module 112 to route the incoming voice call to the same destination.

The voice call routing module 112 receives the routing decision from the voice call classification module 110 and routes (214) the bitstream of the incoming voice call to the remote device 103 using the routing decision associated with the identified historical context vector. In some embodiments, the routing decision comprises an indicator (e.g., Sales, Service) that the module 112 must translate into programmatic routing instructions that can be used to establish a communications session between the client device 102 and the remote device 103. For example, the module 112 can retrieve a network address (e.g., IP address) associated with a sales CSR's workstation if the indicator is Sales, or a plurality of network addresses associated with workstations of a group of CSRs (i.e., the module 112 can employ load balancing techniques to select which remote device 103 should receive the voice call). The voice call routing module 112 then redirects the communication session between the client device 102 and the server computing device 106 to the remote device 103 so that, e.g., a representative at the remote device 103 can handle the voice call to address the user's questions and/or issues.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated predictive call routing using reinforcement learning, the method comprising:

capturing, by a server computing device, a bitstream corresponding to an incoming voice call originating from a first client computing device, the bitstream including metadata comprising one or more attributes of the incoming voice call and one or more attributes of a user of the first client computing device;

determining, by the server computing device, an identity of the user of the first client computing device based upon the bitstream metadata;

generating, by the server computing device, a first context vector for the incoming voice call, the first context vector comprising a multidimensional array corresponding to at least a portion of the bitstream metadata;

inserting, by the server computing device, the first context vector into a high-dimensional vector space comprising a plurality of historical context vectors, each historical context vector (i) corresponding to at least a portion of metadata associated with a historical voice call and (ii) associated with an income value and a routing decision;

determining, by the server computing device, one or more historical context vectors in the high-dimensional vector space that are in proximity to the first context vector, based upon a distance measure between the first context vector and the one or more historical context vectors;

identifying, by the server computing device, one of the determined historical context vectors that has an optimal income value; and routing, by the server computing device, the bitstream of the incoming voice call to a second client computing device to establish a communication session between the first client computing device and the second client computing device, using the routing decision associated with the identified historical context vector that has an optimal income value.

2. The method of claim 1, further comprising:

capturing, by the server computing device, an income value associated with the incoming voice call after routing the bitstream of the incoming voice call to the second client computing device; and updating, by the server computing device, the first context vector in the high-dimensional space to be associated with (i) the income value associated with the incoming voice call and (ii) the routing decision used to route the bitstream of the incoming voice call.

3. The method of claim 1, wherein the routing decision comprises an identification of one or more client computing devices that can receive the incoming voice call.

4. The method of claim 1, wherein generating a first context vector for the incoming voice call comprises:

identifying, by the server computing device, a plurality of features of the incoming voice call to be represented in the first context vector;

clustering, by the server computing device, the plurality of identified features of the incoming voice call into a subset of identified features; and converting, by the server computing device, each identified feature in the subset of identified features into a numeric value based upon the bitstream metadata and aggregating the numeric values into a multidimensional array.

5. The method of claim 1, wherein the distance measure between the first context vector and the one or more historical context vectors comprises one or more of: a Cosine distance measure or a Euclidian distance measure.

6. The method of claim 1, wherein the one or more historical context vectors in the high-dimensional vector space that are in proximity to the first context vector are nearest neighbors to the first context vector.

7. The method of claim 1, wherein identifying one of the determined historical context vectors that has an optimal income value comprises:
predicting, by the server computing device, a confidence value for each of the determined historical context vectors, based upon (i) the distance measure between the first context vector and the determined historical context vector and (ii) the income value associated with the determined historical context vector; and
selecting, by the server computing device, one of the determined historical context vectors that has a highest predicted confidence value.

8. The method of claim 1, wherein identifying one of the determined historical context vectors that has an optimal income value comprises:
selecting, by the server computing device, a first set of the determined historical context vectors that are associated with a first routing decision and are associated with different income values;
selecting, by the server computing device, a second set of the determined historical context vectors that are associated with a second routing decision and are associated with different income values;
sampling, by the server computing device, one of the determined historical context vectors from each of the first set of determined historical context vectors and the second set of determined historical context vectors; and
identifying, by the server computing device, the sampled historical context vector that has a highest income value.

9. The method of claim 1, wherein routing the bitstream of the incoming voice call to a second client computing device comprises:
identifying, by the server computing device, a network address of the second client computing device based upon the routing decision; and
redirecting, by the server computing device, communications from the first client computing device to the second client computing device.

10. A system for automated predictive call routing using reinforcement learning, the system comprising:
a first client computing device and a second client computing device; and
a server computing device coupled to the first client computing device and the second client computing device;
wherein the server computing device comprises a memory for storing computer-executable instructions and a processor that executes the computer-executable instructions to:
capture a bitstream corresponding to an incoming voice call originating from the first client computing device, the bitstream including metadata comprising one or more attributes of the incoming voice call and one or more attributes of a user of the first client computing device;
determine an identity of the user of the first client computing device based upon the bitstream metadata;
generate a first context vector for the incoming voice call, the first context vector comprising a multidimensional array corresponding to at least a portion of the bitstream metadata;
insert the first context vector into a high-dimensional vector space comprising a plurality of historical context vectors, each historical context vector (i) corresponding to at least a portion of metadata associated with a historical voice call and (ii) associated with an income value and a routing decision;
determine one or more historical context vectors in the high-dimensional vector space that are in proximity to the first context vector, based upon a distance measure between the first context vector and the one or more historical context vectors;
identify one of the determined historical context vectors that has an optimal income value; and
route the bitstream of the incoming voice call to the second client computing device to establish a communication session between the first client computing device and the second client computing device, using the routing decision associated with the identified historical context vector that has an optimal income value.

11. The system of claim 10, wherein the server computing device:
captures an income value associated with the incoming voice call after routing the bitstream of the incoming voice call to the second client computing device; and
updates the first context vector in the high-dimensional space to be associated with (i) the income value associated with the incoming voice call and (ii) the routing decision used to route the bitstream of the incoming voice call.

12. The system of claim 10, wherein the routing decision comprises an identification of one or more client computing devices that can receive the incoming voice call.

13. The system of claim 10, wherein generating a first context vector for the incoming voice call comprises:
identifying a plurality of features of the incoming voice call to be represented in the first context vector;
clustering the plurality of identified features of the incoming voice call into a subset of identified features; and
converting each identified feature in the subset of identified features into a numeric value based upon the bitstream metadata and aggregating the numeric values into a multidimensional array.

14. The system of claim 10, wherein the distance measure between the first context vector and the one or more historical context vectors comprises one or more of: a Cosine distance measure or a Euclidian distance measure.

15. The system of claim 10, wherein the one or more historical context vectors in the high-dimensional vector space that are in proximity to the first context vector are nearest neighbors to the first context vector.

16. The system of claim 10, wherein identifying one of the determined historical context vectors that has an optimal income value comprises:
predicting a confidence value for each of the determined historical context vectors, based upon (i) the distance measure between the first context vector and the determined historical context vector and (ii) the income value associated with the determined historical context vector; and
selecting one of the determined historical context vectors that has a highest predicted confidence value.

17. The system of claim 10, wherein identifying one of the determined historical context vectors that has an optimal income value comprises:

selecting a first set of the determined historical context vectors that are associated with a first routing decision and are associated with different income values;

selecting a second set of the determined historical context vectors that are associated with a second routing decision and are associated with different income values;

sampling one of the determined historical context vectors from each of the first set of determined historical context vectors and the second set of determined historical context vectors; and identifying the sampled historical context vector that has a highest income value.

18. The system of claim 10, wherein routing the bitstream of the incoming voice call to a second client computing device comprises:

identifying a network address of the second client computing device based upon the routing decision; and redirecting communications from the first client computing device to the second client computing device.

* * * * *